(12) United States Patent
Moyes et al.

(10) Patent No.: US 8,323,377 B2
(45) Date of Patent: Dec. 4, 2012

(54) RECOVERY OF METALS FROM OXIDISED METALLIFEROUS MATERIALS

(75) Inventors: John Moyes, New South Wales (AU); Frank Houllis, New South Wales (AU); Andrew Tong, New South Wales (AU)

(73) Assignee: Intec, Ltd., Sydney (AU)

( * ) Notice: Subject to any disclaimer, the term of this patent is extended or adjusted under 35 U.S.C. 154(b) by 1551 days.

(21) Appl. No.: 10/594,017

(22) PCT Filed: Mar. 24, 2005

(86) PCT No.: PCT/AU2005/000426
§ 371 (c)(1),
(2), (4) Date: Jun. 22, 2007

(87) PCT Pub. No.: WO2005/093107
PCT Pub. Date: Oct. 6, 2005

(65) Prior Publication Data
US 2007/0295613 A1   Dec. 27, 2007

(30) Foreign Application Priority Data
Mar. 25, 2004   (AU) ............... 2004/901591

(51) Int. Cl.
| C22B 3/06 | (2006.01) |
| C22B 3/10 | (2006.01) |
| C22B 3/44 | (2006.01) |
| C22B 3/46 | (2006.01) |
| C22B 11/06 | (2006.01) |
| C22B 15/00 | (2006.01) |
| C22B 26/22 | (2006.01) |
| C22B 23/00 | (2006.01) |

(52) U.S. Cl. ............... 75/743; 75/740; 75/741; 75/744; 423/27; 423/150.1; 423/166; 423/658.5; 205/560; 210/719

(58) Field of Classification Search .................... 75/724, 75/743, 744, 740, 741; 423/27, 34, 38, 150.1, 423/150.3, 158, 166, 658.5
See application file for complete search history.

(56) References Cited

U.S. PATENT DOCUMENTS

| 3,203,786 | A | * | 8/1965 | Wesolowski et al. | ......... 423/140 |
| 3,545,964 | A | | 10/1970 | Hansen et al. | |
| 3,793,430 | A | | 2/1974 | Weston | |
| 3,950,486 | A | | 4/1976 | Cardwell et al. | |
| 4,378,275 | A | | 3/1983 | Adamson et al. | |
| 4,615,731 | A | | 10/1986 | Thomas et al. | |
| 5,232,490 | A | * | 8/1993 | Bender et al. | .................. 75/733 |
| 5,571,308 | A | | 11/1996 | Duyvesteyn et al. | |
| 5,961,691 | A | | 10/1999 | Pinard et al. | |
| 6,361,753 | B1 | | 3/2002 | Cashman | |
| 6,428,599 | B1 | | 8/2002 | Cashman | |

(Continued)

FOREIGN PATENT DOCUMENTS

AU   47190/00   1/2001

(Continued)

*Primary Examiner* — George Wyszomierski
*Assistant Examiner* — Jared Wood
(74) *Attorney, Agent, or Firm* — Fulwider Patton LLP

(57) ABSTRACT

A process for recovering a target metal from an oxidized metalliferous material comprises the steps of:
  in an acid generation stage, adding sulfuric acid to a solution comprising a metal halide to generate an acidic aqueous halide solution;
  in a leaching stage that is separate to the acid generation stage, leaching the oxidized metalliferous material with the acidic aqueous halide solution to leach the target metal into solution;
  passing the solution from the leaching stage to a target metal recovery stage in which the target metal is recovered from the solution while the metal halide is retained in solution; and
  returning the solution with the metal halide therein from the target metal recovery stage to the acid generation stage.

31 Claims, 3 Drawing Sheets

U.S. PATENT DOCUMENTS

| | | |
|---|---|---|
| 6,471,743 B1 | 10/2002 | Young et al. |
| 2004/0228783 A1 * | 11/2004 | Harris et al. .......... 423/140 |

FOREIGN PATENT DOCUMENTS

| | | |
|---|---|---|
| EP | 0212453 | 3/1987 |
| RU | 94-032801/04 | 12/1992 |
| SU | 28544D/16 | 8/1980 |
| WO | WO 96/23905 | 8/1996 |
| WO | 01/12865 | 2/2001 |
| WO | WO 0222897 A1 * | 3/2002 |
| WO | WO 03035916 A1 * | 5/2003 |

* cited by examiner

RECOVERY OF METALS FROM OXIDISED METALLIFEROUS MATERIALS

TECHNICAL FIELD

A process for the recovery of metals from oxidised metalliferous materials is disclosed. The term "oxidised metalliferous material" includes lateritic materials, electric arc furnace (EAF) dusts & residues, electrolytic zinc plant residues, zinc oxides and zinc ferrites, goethite, arsenic trioxide, etc. The lateritic materials are typically laterite ores, such as nickel, cobalt and optionally other metal laterites.

BACKGROUND ART

Oxidised metalliferous materials such as laterites can have a refractory characteristic. For this reason smelting processes have been used to recover metals such as nickel and cobalt from such materials. However, the severe environmental repercussions of smelting processes have lead to the development of hydrometallurgical recovery processes for some oxidised metalliferous materials.

Known hydrometallurgical processes for the recovery of metals such as nickel and/or cobalt from laterite ores have primarily involved pressure acid leaching, typically at high pressures and employing sulfuric acid. Sulfuric acid is employed because of its abundance, cost and well-known chemistry. U.S. Pat. No. 6,261,527 does discloses a hydrometallurgical process for the recovery of nickel and/or cobalt from laterite ores involving atmospheric pressures, however, it still employs sulfuric acid leaching.

Recently, a process has been proposed which is based on a chloride acid leach as opposed to a sulphuric acid leach. Whilst a chloride leaching medium is a powerful lixiviant, it is corrosive and requires apparatus to be chloride resistant. Chloride media have also been avoided because they have a high acid consumption and can present difficulties with the control of iron and magnesium leaching, both metals typically present in laterites.

The company Chesbar Resources (now known as Jaguar Nickel Inc.) presented a paper at the ALTA 2002 Conference (Nickel/Cobalt-9 session) in Perth, Western Australia on May 18-20, 2003. The paper entitled "Beyond PAL: The Chesbar Option, AAL" outlined a process for the atmospheric chloride acid leaching of nickel laterite ores. The process is now disclosed in WO 2004/101833.

The Chesbar process requires the use of a pyrohydrolysis stage to regenerate from the process liquor HCl as a gas for recycle to leaching, and to regenerate magnesium oxide for use in a nickel/cobalt precipitation stage. However, HCl gas is difficult to handle, being highly corrosive. In addition, a pyrohydrolysis stage is endothermic, requiring the input of significant energy, and hence has both high capital and operating costs.

It would be advantageous if a halide based process could be provided for the recovery from oxidised metalliferous materials of metals such as nickel, cobalt, copper, precious metals, magnesium etc, which does not require a pyrohydrolysis stage and which does not require recycle of a corrosive gas for the acid leaching stage.

SUMMARY OF THE DISCLOSURE

In a first aspect there is provided a process for recovering a target metal from an oxidised metalliferous material, the process comprising the steps of:

in a leaching stage, leaching the oxidised metalliferous material with an acidic aqueous halide solution to leach the target metal into solution, the leaching solution being generated by adding sulfuric acid to a solution comprising a metal halide;

passing the solution from the leaching stage to a target metal recovery stage in which the target metal is recovered from the solution whilst the metal halide is retained in solution; and returning the solution with the metal halide therein from the target metal recovery stage to the leaching stage.

The process thus generates an acidic aqueous halide solution, rather than employing sulfuric acid leaching. The resultant halide based leaching process is typically operated at atmospheric pressures. Whilst elevated leaching pressures can be employed (eg. using autoclave leaching) this will depend on the oxidised metalliferous material to be leached and whether more rapid target metal extraction is required.

Further, the addition of sulfuric acid to generate the acidic aqueous halide solution is exothermic and hence allows the pyrohydrolysis stage of the prior art to be eliminated. This part of the process also avoids the recycling of hydrogen chloride gas as per the prior art. Thus, sulfuric acid addition and acidic aqueous halide solution generation can provide substantial savings in capital and operating costs, typically well in excess of the cost of producing sulfuric acid.

However, in applications such as the treatment of electrolytic zinc plant residues, sulfuric acid is a by-product of the electrolytic zinc plant process, so the acid can then be utilised economically in the process for treatment of such residues.

Where a sulfuric acid plant is employed to produce the sulfuric acid for addition to the present process, such plants produce massive amounts of excess heat (ie. as a result of exothermic reactions) which can then be used to heat the process solution, to provide further savings in capital and operating costs.

Depending on the oxidised metalliferous material to be treated, the target metal can include nickel, cobalt, zinc, copper, arsenic, iron, magnesium, precious metals such as gold, silver, platinum etc.

Usually the metal selected for the metal halide solution is one that does not interfere with leaching of the target metal or its recovery as a precipitate. A metal may be selected that forms a precipitate with the sulfate anion of the acid such that, with the generation of the leaching solution, a hydrohalous acid forms together with a precipitate of the metal sulfate. In this regard, the metal may be calcium so that the metal sulfate precipitate is calcium sulfate, which can then form a saleable by-product. However, sodium can be present as a solution metal where the halide is derived from a sodium halide salt. In addition, magnesium chloride may also be used when the material contains high levels of magnesium (eg. to suppress Mg extraction).

Usually and expediently the halide of the metal halide solution is chloride, again because of the abundance of low cost chloride salts such as NaCl. Hence, hydrochloric acid will continuously be formed as the solution metal precipitates with the sulfate, without the need to form and add or recycle hydrogen chloride gas, as in the prior art. This avoids the handling difficulties and hazards associated with hydrogen chloride gas. However, other halides such as bromide or iodide can be employed, for example, where the metalliferous material includes precious metals. In this regard NaBr may then also be added to the solution, as bromide complexes more strongly than chloride and hence can stabilise the precious metals in solution.

Depending on the type of oxidised metalliferous material, the leaching stage may comprise first and second leaching stages that operate in a counter-current configuration, whereby:

the oxidised metalliferous material is added to the first leaching stage to contact the solution and leach target metal into solution; and the solution from the first leaching stage is separated from first leached solids and passed to the target metal recovery stage; and the first leached solids are passed to the second leaching stage to be mixed with the leaching solution; and the solution from the second leaching stage is separated from second leached solids and passed to the first leaching stage, and the second leached solids are discarded as residue.

By employing a two-stage leaching process, target metal(s) can be partially leached from the oxidised metalliferous material in the first leaching stage, and can be further leached into solution in the second leaching stage by contacting the first solids with the hydrohalous acid. Then, leached target metal(s) from the second leaching stage can be returned with the solution to the first leaching stage, and thereafter can pass with the separated solution from the first leaching stage to the target metal recovery stage.

Further, when the solids from the first leaching stage are passed to the second leaching stage they are, in effect, contacted with a solution of relatively high acidity (ie. compared to the solution acidity in the first leaching stage) such that a proportion of remaining target metal in the solids is then leached into the solution for subsequent recovery.

In one form the leaching solution can be generated in a separate hydrohalous acid generation stage in which the sulfuric acid is added to the solution comprising the metal halide, and this leaching solution is then fed to the second leaching stage to mix with the first leached solids. This stage allows for a metal sulfate precipitate to be formed and easily separated out from the leaching solution, which metal sulfate may be of a relative high purity. For example, the metal of the metal halide solution can be one that forms a precipitate with the sulfate anion of the sulfuric acid such that, with the generation of the leaching solution, a hydrohalous acid forms together with a precipitate of the metal sulfate, the metal sulfate precipitate being removed as a solid residue stream from the hydrohalous acid generation stage (eg. as a saleable by-product such as calcium sulfate).

In addition, a portion of that solution being passed from the second to the first leaching stage can be diverted to the hydrohalous acid generation stage to thereby easily provide the solution comprising the metal halide, with the balance of leaching solution then being made up from the solution of the added sulfuric acid.

In another form the sulfuric acid can be added directly to the second leaching stage. Again, the metal of the metal halide solution can be one that forms a precipitate with the sulfate anion of the sulfuric acid such that, with the generation of the leaching solution, a hydrohalous acid forms together with a precipitate of the metal sulfate, the metal sulfate precipitate then being removed with the second leached solids and discarded as residue.

Usually the target metal recovery stage comprises a precipitation stage in which a precipitate of the target metal is formed by adding a precipitation agent to the solution. This is a simple and expedient way of removing the or each target metal. When the oxidised metalliferous material comprises more than one target metal, a respective precipitation stage can thus be provided for each target metal. These stages may be arranged in the process in series.

In addition, whilst an anion of the precipitation agent can cause target metal precipitation, the agent may also be used to introduce the metal of the metal halide solution (eg. the precipitation agent cation may be calcium). Thus, addition of the precipitation agent can maintain a desired concentration of that metal in solution, and to balance the process the metal may later be removed as a metal sulfate precipitate when the hydrohalous acid is formed.

The oxidised metalliferous material may comprise more than one target metal, and a respective precipitation stage is provided for each target metal.

For example, when the oxidised metalliferous material includes iron, a proportion of that iron can be leached into solution in the leaching stage, and at least a proportion of the leached iron can then be precipitated in an iron precipitation stage as ferric oxide through the addition of calcium carbonate as the precipitation agent. In such case, the oxidised metalliferous material may be given sufficient residence time in the leaching stage such that leached iron is oxidised through to haematite.

Further, in the iron precipitation stage the addition of the calcium carbonate increases the solution pH and causes the iron to precipitate as ferric oxide.

When the target metal includes copper, the precious metal can be precipitated in a copper precipitation stage by adding calcium carbonate as the precipitation agent.

When the target metal includes a precious metal, the precious metal can be precipitated in a precious metal precipitation stage by adding NaSH as the precipitation agent.

When the target metal includes nickel and/or cobalt, the nickel and/or cobalt can be precipitated in a nickel/cobalt precipitation stage by adding calcium hydroxide as the precipitation agent.

When the target metal includes magnesium, the magnesium can be precipitated in a magnesium precipitation stage by adding calcium hydroxide as the precipitation agent.

In both of these cases the calcium hydroxide can be slaked lime.

In an alternative arrangement the target metal recovery stage can comprise an electrolytic recovery stage, whereby the solution from the leaching stage is passed to one or more electrolysis cells for metal recovery by electro-deposition. When the oxidised metalliferous material comprises more than one target metal, a respective electrolytic recovery stage can be provided for each target metal, eg. arranged in series in the process.

For metalliferous material comprising multiple target metals, combinations of precipitation and electrolytic recovery stages in series or parallel arrangements in the process may also be employed.

In a process variation that doesn't employ the separate hydrohalous acid generation stage, and where iron is present in the metalliferous material, air can be added to the first and/or second leaching stages, with or without the addition of copper as a $Cu^+/Cu^{2+}$ oxidation couple, to maximise iron oxidation such that all iron precipitates as ferric oxide (haematite) in the leaching stage.

The leached solids and solution from the second leaching stage are usually separated in a separation stage, with the solution being recycled to the first leaching stage and the solids discarded as leach residue.

In one option, solution separated from solids after the or each precipitation stage can be returned directly to the first leaching stage. In an alternative arrangement, solution separated from solids after the or each precipitation stage can be first passed to the separation stage after second leaching to wash the separated solids, and then be recombined with the solution recycled to the first leaching stage. This wash can help maximise retrieval of the target metal.

Usually the oxidised metalliferous material has a residence time in the leaching stage of greater than 10 hours, so that metals such as iron are leached and fully oxidised (eg. through to haematite). This ensures that discarded residues when disposed of are in a more stable and safe form for the environment.

The sulfuric acid may be added to the leaching stage to achieve a pH in the range 0 to 1 and a solution Eh of 600 mV (ref Ag/AgCl). The solution in the leaching stage can have a temperature ranging from 85-110° C.

When the halide in the metal halide solution is chloride, total chloride concentration may be in the range of 6 to 8 M, and when the metal in the metal halide solution is calcium, at least 30 g/l of $CaCl_2$ can be maintained in the leaching stage.

In a second aspect there is provided a process for leaching a target metal from an oxidised metalliferous material, the process comprising first and second leaching stages in which an acidic aqueous halide solution generated from sulfuric acid and used for leaching the target metal into solution passes counter-currently therethrough, wherein the acid generated from sulfuric acid is added to the second stage, and the oxidised metalliferous material is fed to the first leaching stage and contacted with a recycle of residual acid in solution from the second leaching stage to leach the material and produce first leached solids, and wherein the solution is separated from the first leached solids and may be passed to target metal recovery, whereas the first leached solids are passed to the second leaching stage for contact with the added acid for further leaching of the solids whilst producing the residual acid recycle solution.

The acid generated from sulfuric acid can be generated in a separate stage from the second leaching stage prior to being added thereto, or may be generated in the second leaching stage.

The process of the second aspect finds particular application where the oxidised metalliferous material includes iron, particularly at high levels. Thus a proportion of the iron can be leached into solution in the first leaching stage and a proportion of the leached iron can later be removed (eg. precipitated as ferric oxide, typically haematite). The ferric oxide (eg haematite) precipitate can for example pass with the solids to the second leaching stage, to thereafter pass with leaching residue from the second leaching stage to disposal.

The process of the second aspect can otherwise be as defined for the first aspect.

This disclosure also extends to any metal produced by the process of the first and second aspects.

BRIEF DESCRIPTION OF THE DRAWINGS

Notwithstanding any other forms which may fall within the scope of the process as defined in the Summary, specific forms of the process will now be described, by way of example only, with reference to the accompanying drawing in which.

DETAILED DESCRIPTION OF SPECIFIC EMBODIMENTS

Figure 1:
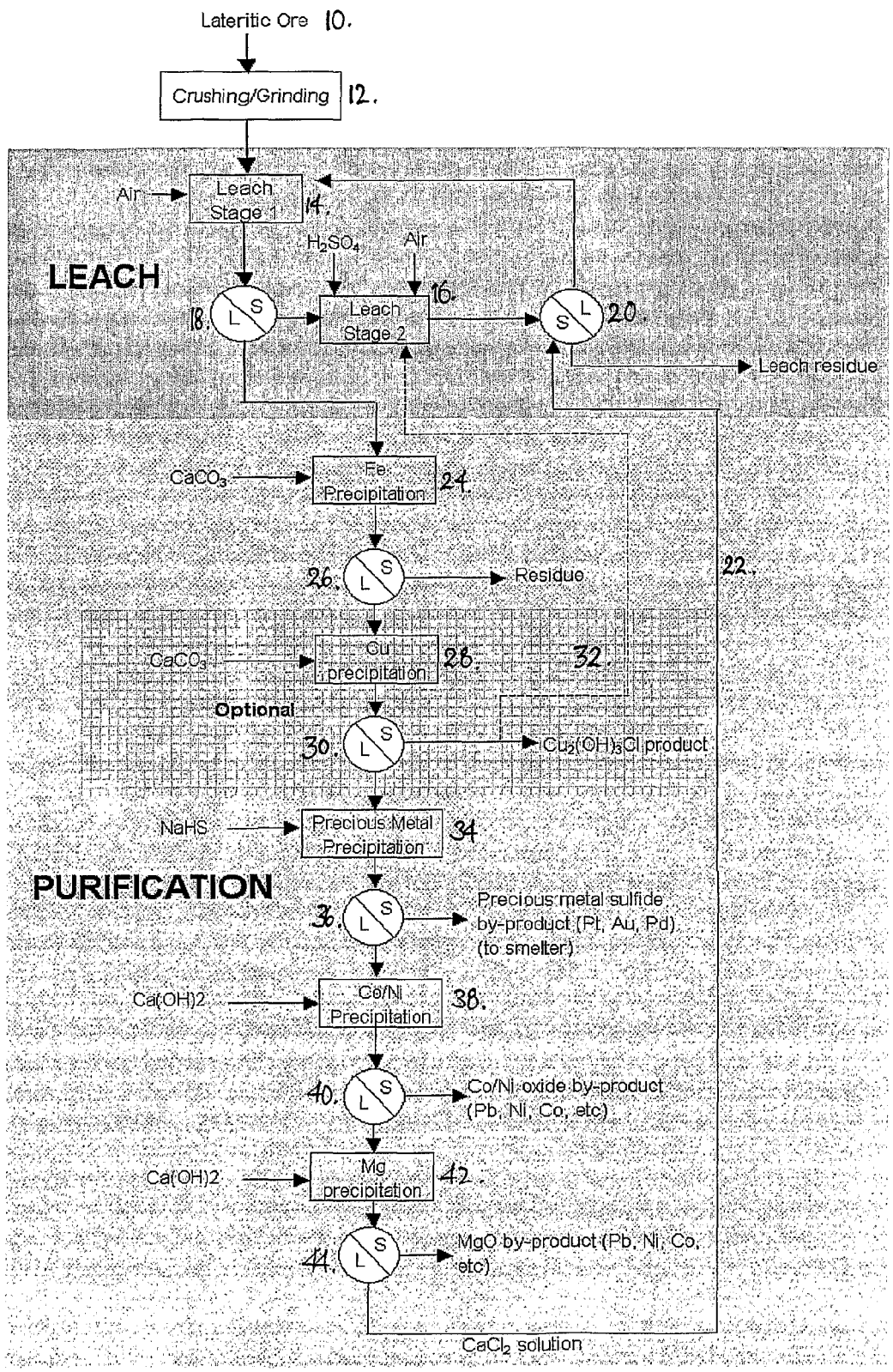
FIG. 1 shows a flow diagram for a first process for recovering metals from a laterite ore.

Process of FIG. 1

FIG. 1 depicts a first recovery process for a lateritic ore and comprises a LEACH process coupled to a PURIFICATION (eg. precipitation) process, together with solution recycle. The recovery process of FIG. 1 can be generalised to the recovery of one or more target metals from other oxidised metalliferous materials.

In the LEACH process, a lateritic ore 10 (which can also be a pre-prepared laterite concentrate) is crushed and ground at 12 and is then fed to an optional two stage counter-current leaching process having a first leach stage 14 and a second leach stage 16, both of which operate at atmospheric pressure. The counter-current two stage leach benefits $H_2SO_4$ consumption as compared to a single stage leach but is more complex. In addition, either leach stage has the option of being run at higher pressures (and thus higher temperatures) using an autoclave (eg. to minimise $H_2SO_4$ consumption and increase target metal extraction efficiencies, although increasing capital and operating costs).

Whilst a single stage leach can be used for simplicity and cost, the actual configuration used depends on the metalliferous material feed composition. With feed variation, the degree of benefit of $H_2SO_4$ consumption will vary and the two stage configuration may or may not be required.

An acidic aqueous calcium chloride solution is passed through leach stage 16, the solution having a pH in the range of 0-1. This pH is achieved through the addition of sulfuric acid at levels sufficient to leach into solution target metals such as nickel, cobalt and precious metals. The solution leaches the already partially leached laterite residual solids that are received from leach stage 14 via a thickening stage 18.

In leach stage 16 the solution has a temperature in the range of 85 to 110° C., an Eh controlled at ~600 mV (versus Ag/AgCl), and a total chloride concentration in the range of 6 to 8M. However, the required solution for leaching depends on the mineralogy of the metalliferous material, in particular the types and quantities of acid consumers contained in the ore. For example, for lateritic ores, a minimum of 30 g/l of $CaCl_2$ is maintained in the leach to suppress jarosite formation, in turn optimising iron precipitation as haematite. The solution residence time is typically greater than 10 hours, to achieve full iron oxidation, and to release target metals into solution.

Optionally, air can be sparged into the solution to maximise iron conversion through to haematite, and copper can be added to further assist oxidation as described below.

When higher leach solution temperatures are required (eg. up to and in the vicinity of 200° C.) then leaching in an autoclave can be employed.

The slurry of leached solids and solution is then passed from stage 16 to a filtration stage 20 where residual solids are filtered and separated, the solids being washed by a $CaCl_2$ recycle stream 22 from the PURIFICATION process (with an optional additional water wash being employed) to recover interstitial target metals. The washed solids are disposed of whereas the solution and stream 22 (and any wash water) are combined and recycled to the first leach stage 14.

The acid depleted recycle now has a higher pH (the differential may be 1 or greater) and is used for a preliminary leach of the ore 10. The acid depleted recycle typically leaches a proportion of the iron into solution, from goethite ($\alpha$-FeOOH) and akagenite ($\beta$-FeOOH) through to haematite ($Fe_2O_3$) as described below. Again the residence time can be 10 hours or greater and, aside from pH and Eh, the solution parameters in stage 14 are similar to stage 16 described above. The partially leached solids and solution are then passed to thickening stage 18 where a clear liquor overflow is passed to the PURIFICATION process and the solids underflow is passed to second leach stage 16.

In the PURIFICATION process the clear liquor overflow is first passed to an iron removal stage 24, where calcium carbonate is added to cause haematite ($Fe_2O_3$) to form and precipitate (described below). The haematite is filtered out at separation stage 26.

Optionally, where copper has been used in the leaching process to enhance oxidation, the copper is next removed from the liquor at copper precipitation stage 28 by the addition of calcium carbonate, and is filtered out at separation stage 30. The copper residue can be reclaimed, or recycled back to the leaching process for re-use, as recycle 32.

The liquor is now passed to a precious metal recovery stage 34 where NaSH is added to precipitate out the precious metals (described below). The precious metals are filtered out at separation stage 36 and recovered by smelting etc.

Next, the liquor is passed to a nickel/cobalt recovery stage 38 where slaked lime ($Ca(OH)_2$) is added to precipitate out the nickel and cobalt. The nickel and cobalt are filtered out at separation stage 40 and are then recovered. Any lead (Pb) in the ore can also be recovered at this stage.

Finally, where magnesium is present in the ore the liquor can be passed to a magnesium recovery stage 42, again where slaked lime ($Ca(OH)_2$) is added to precipitate out the magnesium (described below). The magnesium is then filtered out at separation stage 44 and recovered, optionally with any other metals still present in the liquor.

The resulting purified liquor ($CaCl_2$ recycle solution 22) is now returned to the LEACHING process.

Figure 2:
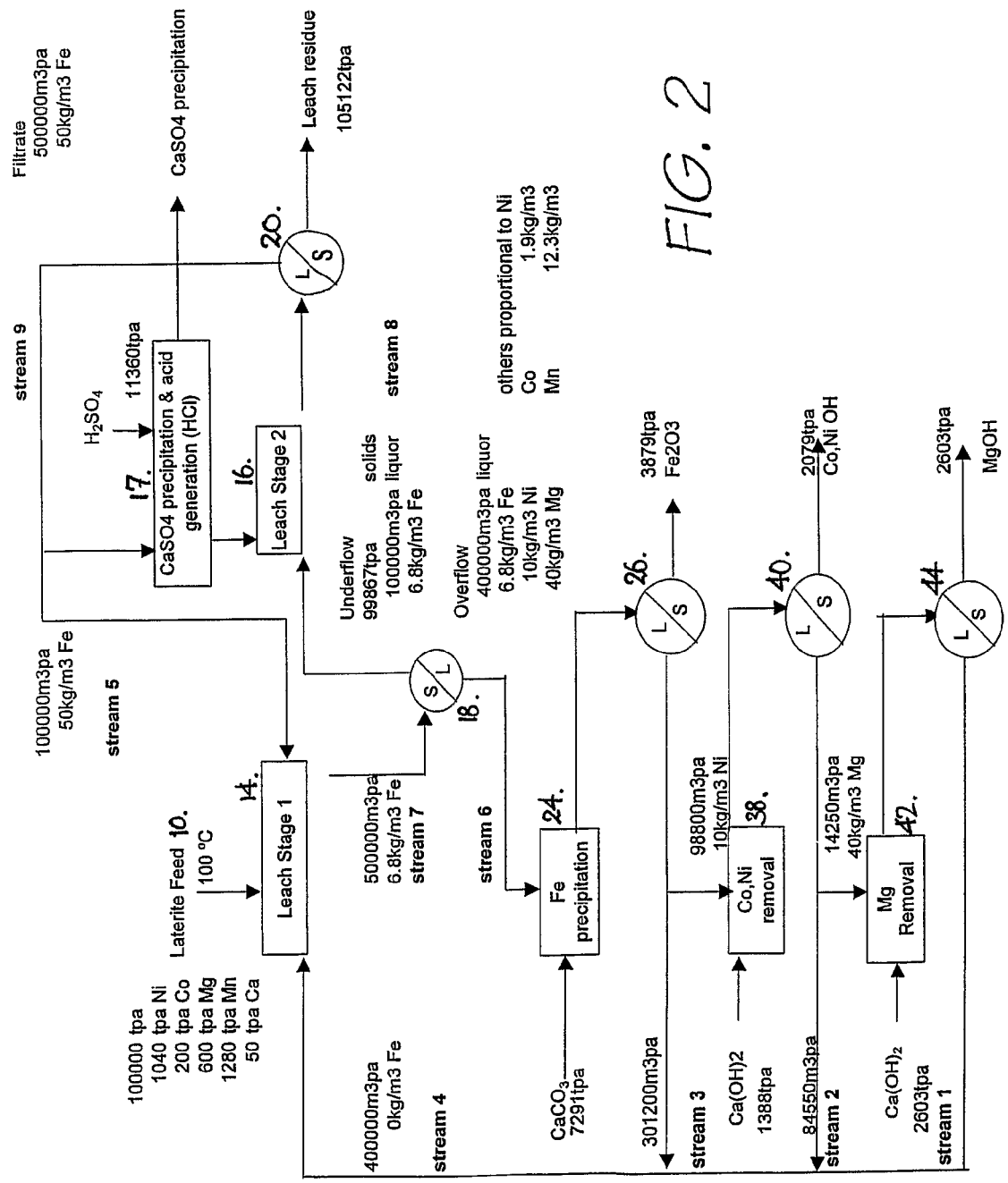
FIG. 2 shows a flow diagram for a second process for recovering metals from a laterite ore.

Process of FIG. 2

FIG. 2 depicts a second alternative recovery process, where like reference numerals are used to denote similar or like process stages to those of FIG. 1. The recovery process of FIG. 2 is again depicted for a laterite feed but can be generalised to the recovery of one or more target metals from other oxidised metalliferous materials.

The recovery process of FIG. 2 again comprises a two-stage leach process, with separated solution from the first leaching stage again being passed to target metal recovery stages (eg. precipitation and/or electrolytic recovery), but with solution recycle from the target metal recovery stages direct to the first leaching stage.

In the two-stage leach process, a crushed and ground laterite feed 10 (having the metal concentration listed) is fed to the first leach stage 14 and then to second leach stage 16, both of which again operate at atmospheric pressure. Again, either leach stage has the option of being run at higher pressures (and temperatures) using an autoclave.

As distinct from the process of FIG. 1, the process of FIG. 2 comprises a separate acid generation stage 17 in which the acidic chloride solution is generated. In this regard, an $H_2SO_4$ solution is added to stage 17 together with a diverted stream 19, being a portion of the leach recycle ("stream 9"). The stream 9 comprises aqueous calcium chloride so that the diverted stream 19, which when contacted with the $H_2SO_4$ solution, generates the acidic chloride (HCl) solution and a calcium sulfate precipitate (separated in stage 17 as a saleable by-product).

The acidic chloride (HCl) solution is passed to leach stage 16, the solution having a pH in the range of 0-1, sufficient to leach into solution target metals such as nickel, cobalt, iron, magnesium, precious metals etc. The acidic solution leaches the partially leached residual solids ("stream 8") that are received from leach stage 14 via solid/liquid separation stage 18.

In leach stage 16 the solution has a temperature in the range of 85 up to 110° C., with other parameters being similar to those described for the process of FIG. 1.

The slurry of leached solids and solution is then passed from stage 16 to another solid/liquid separation stage 20, where residual solids are separated and discarded whereas part of the solution ("stream 5") is recycled to the first leach stage 14.

Again, this acid depleted recycle typically leaches a proportion of any iron in the feed into solution, with the solution parameters in stage 14 being similar to those described for the process of FIG. 1.

The partially leached solids and solution are passed to solid/liquid separation stage 18 (as "stream 7") where a clear liquor overflow ("stream 6") is passed to the target metal recovery, the solids underflow ("stream 8") being passed to second leach stage 16.

In target metal recovery the clear liquor overflow is first passed to an iron precipitation stage 24, where calcium carbonate is added to cause haematite ($Fe_2O_3$) to form and precipitate. The haematite is separated out (eg. filtered) at separation stage 26.

A portion of the liquor ("stream 3") is recycled to the first leach stage 14, with the balance being passed to a nickel/cobalt removal stage 38. In stage 38 slaked lime ($Ca(OH)_2$) is added to precipitate out the nickel and cobalt, which are then separated out (eg. filtered) at separation stage 40, for subsequent recovery.

A portion of the liquor ("stream 2") is again recycled to the first leach stage 14 whereas, to separate out magnesium present in the feed, the balance of liquor is passed to a magnesium removal stage 42. In stage 42 again slaked lime ($Ca(OH)_2$) is added to precipitate out the magnesium. The magnesium is then separated out (eg. filtered) at separation stage 44, for subsequent recovery. The separated liquor from stage 44 ("stream 1") is recycled to the first leach stage 14, (combining with streams 2 and 3 as stream 4).

EXAMPLES

Non-limiting examples of the processes described above will now be provided.

Example 1

A first process, hereafter referred to as the Intec Oxidised Metalliferous Materials Process (IOMMP) was developed as a halide-based alternative for the recovery of nickel and associated by-products from lateritic deposits. Previously the development of such deposits was generally by way of pressure acid leach (PAL) or high pressure acid leaching (HPAL).

The IOMMP employed a chloride medium, as opposed to the conventional sulphate medium in PAL and HPAL. The main advantage of the chloride medium is the ability to operate the leach at atmospheric pressure, without reliance on pyrohydrolysis to recover HCl for leaching and MgO for liquor purification.

The IOMMP was based on the input of $H_2SO_4$ for leaching and a calcium based alkali for purification, which eliminated the need for pyrohydrolysis. The IOMMP process was also not constrained by the types of halide salts employed. In this respect NaCl was a more cost effective source of chloride ion, whilst NaBr was able to be used to enhance the complexing of precious metals (Au, Ag, Pt, etc).

Conditions in the IOMMP leach were conducive to haematite precipitation. In particular, the temperature was in the range of 85 to 110° C., pH 0-1, residence time >10 hours, Eh was controlled at ~600 mV (versus Ag/AgCl), and total chloride was in the range of 6 to 8M.

Chemistry

Reference will now be made to the two main circuits of leaching and target metal recovery of FIGS. 1 and 2.

Leaching

The leach configuration and conditions depended on:
the mineralogy of the feed material; and
the relationship between acid consumption and metal extraction.

The counter-current two stage leach of FIGS. 1 and 2 was observed to benefit $H_2SO_4$ consumption as compared to a single stage leach.

The solution for leaching depended on the mineralogy of the material, in particular the types and quantities of contained acid consumers. A minimum of 30 g/l of $CaCl_2$ was maintained in the leach to suppress jarosite formation, in turn optimising iron precipitation as haematite.

The preferred source of chloride was NaCl due to its low cost, but when the feed material contained high levels of Mg, then $MgCl_2$ was used to suppress Mg extraction in order to minimise $H_2SO_4$ demand. The actual $H_2SO_4$ demand was a compromise between its cost and the value of extracted metals.

The level of $CaCl_2$ in the incoming leach liquor was equivalent to the $H_2SO_4$ demand according to the following mechanism:

$$H_2SO_4 + CaCl_2 \rightarrow CaSO_4 + 2HCl \text{ (acid addition to leach)} \quad (1)$$

$$2HCl + MO \rightarrow H_2O + MCl_2 \text{ (metal oxide leaching)} \quad (2)$$

$$MCl_2 + CaO \rightarrow CaCl_2 + MO \text{ (purification)} \quad (3)$$

Thus the higher the overall metal leached the greater was the background of $CaCl_2$, due to the increased addition of acid to the leach and alkali in purification.

The option existed to add NaBr to the background solution where high levels of precious metals existed in the feed. Bromide was observed to be a stronger complex than chloride in terms of its ability to stabilise the precious metal ions in solution.

An important aspect of the leach was to maximise the rejection of iron as haematite ($Fe_2O_3$). The formation of goethite ($\alpha$-FeOOH) and akagenite ($\beta$-FeOOH) in the chloride medium was noted, and over time the FeOOH underwent dehydration to haematite according to the reaction:

$$2FeOOH \rightarrow Fe_2O_3 + H_2O \quad (4)$$

Haematite was the main form of iron oxide generated and this was attributed to the high residence time at >10 hours, the relatively high temperature at >85° C., the desiccating effect of the chloride medium and the availability of seed particles in the continuous leach.

Another important aspect of the process was to minimise the consumption of $H_2SO_4$ and consequently $CaCO_3$. This was achieved through the dehydration reaction (4) described above. Haematite ($Fe_2O_3$) was a significantly more stable form of iron oxide than goethite or the various forms found in laterite and other feed materials. The transformation of iron minerals through goethite to haematite showed no net consumption of acid as demonstrated by the reactions below:

$$(iron\ minerals) + 6H^+ \rightarrow 2Fe^{3+} + 3H_2O \quad (5)$$

$$2Fe^{3+} + 3H_2O \rightarrow Fe_2O_3 + 6H^+ \quad (6)$$

$$(iron\ minerals) \rightarrow Fe_2O_3 \quad (7)$$

Acid consumption was very significantly reduced by this route, and consequently, process economics were significantly improved.

Air was able to be added to the leach to maximise iron precipitation by ensuring any reduced species such as FeO were oxidised to $Fe_2O_3$ as per the reaction:

$$4FeO + O_2 \rightarrow 2Fe_2O_3 \quad (8)$$

The rate of air addition was controlled to maintain the Eh at ~600 mV (versus Ag/AgCl). Further a possibility existed for the addition of copper into the solution, as the $Cu^+/Cu^{2+}$ oxidation couple was more effective than the $Fe^{2+}/Fe^{3+}$ couple in the uptake of oxygen.

The residue generated from the leach is firstly washed with brine from the purification circuit to displace valuable metal ions from the interstitial liquor. Subsequently a countercurrent washing regime is used to minimise wash water, which ultimately must be evaporated from the liquor through the input of heat.

Target Metal Recovery

Metal recovery in FIG. 1 was usually based on precipitation using the calcium based alkalis of $CaCO_3$ and $Ca(OH)_2$. An alternative to precipitation was electrolytic recovery or even solvent extraction or ion exchange, where the various metal cations could be extracted in the process, replenishing the solution with acid ($H^+$). The choice of metal recovery step was a trade-off between the cost of the process step and its increased complexity, versus the reduced acid demand and the possibly higher value of products generated.

In the alkali precipitation route iron was the first to be precipitated at pH 2 with the addition of limestone according to the reaction:

$$2Fe^{3+} + 3CaCO_3 \rightarrow Fe_2O_3 + 3CO_2 + 3Ca^{2+} \quad (9)$$

Subsequently, copper (where added or present) was precipitated at pH 3 to 4 with the addition of limestone according to the reaction:

$$4CuCl_2 + 3CaCO_3 + 3H_2O \rightarrow 2Cu_2(OH)_3Cl + 3CO_2 + 3CaCl_2 \quad (10)$$

Precious metal extraction where required was via NaSH addition and was followed by precipitation of the remaining base metal ions with slaked lime addition according to the reaction:

$$M^{2+}+Ca(OH)_2 \rightarrow MO+Ca^{2+}+H_2O \quad (11)$$

In the nickel and cobalt removal stage, nickel and cobalt were precipitated by slaked lime addition. In the final removal stage magnesium was precipitated by slaked lime addition according to the reaction:

$$Mg^{2+}+Ca(OH)_2 \rightarrow MgO+Ca^{2+}+H_2O \quad (12)$$

The $CaCl_2$ rich liquor remaining was returned to the leach.

Example 2

Zinc Ferrite Leach Trial

A leach trial was carried out on a sample of zinc ferrite residue from an Electrolytic Zinc Plant to determine metal extraction efficiencies.

A 50 kg (wet) sample of the zinc ferrite was slurried at a density of 200 g/L in a brine formulated to match the process conditions for the first leach stage.

The brine had the following major components:

| Component | Concentration g/L |
|---|---|
| $CaCl_2$ | 280 |
| NaCl | 50 |
| $FeCl_3$ | 50 |
| $ZnCl_2$ | 75 |

The solution metal concentrations were monitored over time with the results shown in the table below.

| Time (Hours) | [Fe] (g/L) | [Cu] (g/L) | [Pb] (g/L) | [Zn] (g/L) | [Ag] (ppm) | Temp | pH | Dry Weight (kg) |
|---|---|---|---|---|---|---|---|---|
| 0 | 20.5 | 1.0 | 6.2 | 36.4 | 20 | 105 | 0.05 | 46.0 |
| 1 | 21.0 | — | — | 40.4 | — | 106 | 0.30 | — |
| 3 | 21.3 | — | — | 42.5 | — | 106 | 0.55 | — |
| 5 | 22.5 | — | — | 43.7 | — | 105 | 0.56 | — |
| 7 | 21.4 | — | — | 44.3 | — | 106 | 0.48 | — |
| 9 | 23.4 | — | — | — | — | 106 | 0.50 | — |
| 11 | 24.6 | 1.6 | 7.6 | 45.4 | 88 | 106 | 0.49 | 32.9 |

First Leach Stage

The leach residue from the first leach stage simulation was filtered and washed with water and analysed. The results are shown in the table below.

| Element | Unit | Zn Ferrite Feed | First Stage Leach Residue | First Stage Leach Extract. |
|---|---|---|---|---|
| Ag | ppm | 444 | 15 | 97.6% |
| Cu | ppm | 4960 | 2295 | 66.9% |
| Fe | % | 22.2 | 27.5 | 11.3% |
| Pb | % | 9.22 | 1.3 | 90.0% |
| Zn | % | 15.0 | 14.6 | 30.6% |
| Mass | kg | 46.00 | 32.9 | |

As can be seen from the table above, essentially all of the silver and lead were extracted, while only 30% of the zinc was extracted.

The leach residue from the first leach stage simulation was then used as the feed to a second leach stage simulation according to the process flowsheets (FIGS. 1 and 2). The residue was slurried in 250 liters of brine prepared according to the process flowsheet and sulfuric acid was added over time. The results are shown in the table below.

| Time (Hours) | $H_2SO_4$ Addition (kg) | [Fe] (g/L) | [Cu] (g/L) | [Zn] (g/L) | Residue [Zn] (wt %) | Zn Cumul. Extraction (%) | [Ag] (ppm) | Temp | pH | Dry Weight (kg) |
|---|---|---|---|---|---|---|---|---|---|---|
| 0 | 0 | 78 | 3.1 | 36 | 14.55 | 30.6 | 30 | 106 | 0 | 32.9 |
| 6 | 15 | — | — | — | 6.20 | 47.7 | — | 103 | 0 | — |
| 18 | | — | — | — | 5.70 | 60.3 | — | 107 | 0 | — |
| 22 | 7.5 | — | — | — | 2.77 | 76.6 | — | 107 | 0 | — |
| 26 | | — | — | — | 0.40 | 96.6 | — | 106 | 0 | — |
| 30 | 7.5 | — | — | — | 0.37 | 96.9 | — | 101 | 0 | — |
| 34 | | — | — | — | 0.08 | 99.4 | — | 106 | 0 | — |
| 44 | | 98 | 3.6 | 61 | 0.04 | 99.6 | 35 | 106 | 0 | 63.2 |

Second Leach Stage

A total of 30 kg of sulfuric acid was added over a period of 44 hours and three separate doses equivalent to addition rates of 330 kg/t, 490 kg/t and 650 kg/t of zinc ferrite residue (dry) were made. A small sample of the leach residue was collected just before each acid addition and analysed for zinc with the results shown in the table below, along with the zinc extraction for the second leach stage test, and the cumulative extraction for both first and second leach stages.

| $H_2SO_4$ Addition (kg/t) | Zn in Residue (wt %) | Extraction Leach 2 (%) | Cum. Extract. (%) |
|---|---|---|---|
| 0 | 14.55% | 0.0% | 30.6% |
| 330 | 5.70% | 42.8% | 60.3% |
| 490 | 0.40% | 95.4% | 96.9% |
| 650 | 0.12% | 98.4% | 99.6% |

From these results it can be seen that high zinc extraction can be achieved at an acid addition rate of 490 kg/t.

The whole of the leach residue from the second leach stage test was filtered and washed with water, and then analysed for a range of metals, with the results shown in the table below (and including the first leach stage results for clarity and comparison).

| Element | Unit | Zn Ferrite Feed | First Stage Leach Residue | First Stage Leach Extract. | Second Stage Leach Residue | Second Stage Leach Extract. | Cumulative Extraction |
|---|---|---|---|---|---|---|---|
| Ag | ppm | 444 | 15 | 97.6% | 10 | −28% | 97% |
| Cu | ppm | 4960 | 2295 | 66.9% | 52.5 | 96% | 99% |
| Fe | % | 22.2 | 27.5 | 11.3% | 2.15 | 85% | 87% |
| Pb | % | 9.22 | 1.3 | 90.0% | 0.18 | 74% | 97% |
| Zn | % | 15.0 | 14.6 | 30.6% | 0.12 | 98% | 99.6% |
| Mass | kg | 46.00 | 32.9 | | 63.2 | | |

From these results it can be seen that extraction efficiencies for Ag, Cu, Pb and Zn are very high at 97% or above, which clearly demonstrates the capability of the process to treat zinc ferrite residues to recover metal values.

Example 3

EAF Dust Leach Trials

A series of leach trials were carried out on a sample of EAF dust. These types of materials were noted to be mainly composed of refractory zinc ferrites along with varying quantities of other more simple metal oxides formed at high temperatures in the electric arc furnace.

First Stage Leach

The effectiveness of the first stage leach was tested by preparing a slurry of 240 g of EAF dust in 4 liters of a bromide-based brine with the following composition.

| Component | Concentration (g/L) |
|---|---|
| $CaCl_2$ | 85 |
| $CuCl_2$ | 40 |
| $FeCl_3$ | 175 |
| $PbCl_2$ | 10 |
| $ZnCl_2$ | 170 |
| NaBr | 100 |

The solution metal concentrations were monitored over time with the results shown in the table below.

| Minutes | T (° C.) | pH | Ag (ppm) | Cu (g/L) | Fe (g/L) | Pb (g/L) | Zn (g/L) | Dry wt (g) |
|---|---|---|---|---|---|---|---|---|
| 0 | 90 | <0.1 | <0.1 | 20.3 | 56.7 | 7.0 | 79.7 | 240 |
| 10 | 91 | <0.1 | — | — | — | — | — | — |
| 30 | 94 | <0.1 | 2.1 | 20.2 | 50.3 | 7.0 | 97.6 | — |
| 60 | 97 | <0.1 | 2.2 | 19.9 | 49.2 | 7.7 | 97.1 | — |
| 90 | 97 | <0.1 | — | 19.9 | 49.1 | 7.6 | 97.4 | — |
| 120 | 93 | <0.1 | 2.3 | 19.9 | 49.0 | 6.7 | 97.4 | — |
| 150 | 94 | <0.1 | 2.4 | 19.9 | 49.1 | 6.0 | 95.1 | — |
| 180 | 96 | <0.1 | 2.2 | 20.2 | 49.7 | 6.0 | — | 180 |

The leach residue from the first stage leach simulation was filtered and washed with water and analysed with the results shown in the table below.

| Metal | Unit | EAF dust feed | First Stage Leach Residue | First Stage Leach Extraction |
|---|---|---|---|---|
| Ag | ppm | 45.5 | 0.9 | 98.5% |
| Cu | ppm | 15150 | 1200 | 94.1% |
| Fe | % | 20.55 | 39.0 | −42.4% |
| Pb | % | 2.81 | 4.2 | −10.9% |
| Zn | % | 30.6 | 6.8 | 83.3% |
| Mass | g | 240 | 180 | |

The precipitation of iron into the leach residue was the result of acid consumption from leaching of the EAF dust. Essentially all of the silver and copper were leached, along with 83% of the zinc. Some lead appeared to precipitate from the solution, which may have resulted from cooling of the solution during filtration. Due to the high recovery of the metals in the first stage leach, this residue did not need to be processed by a second stage leach.

The effectiveness of the first stage leach, for a system not containing bromide, was tested by preparing a slurry of EAF dust at a density of 100 g/L in a brine containing:

| Component | Concentration (g/L) |
|---|---|
| $CaCl_2$ | 100 |
| NaCl | 50 |
| $FeCl_3$ | 60 |

The leach residue from the first stage leach simulation was filtered and washed with water and analysed with the results shown in the table below:

| Metal | Unit | EAF dust feed | First Stage Leach Residue | First Stage Leach Extraction |
|---|---|---|---|---|
| Ag | ppm | 45.5 | 53 | 0 |
| Cu | % | 1.51 | 0.13 | 92.6 |
| Fe | % | 20.55 | 46.72 | −95.4 |
| Pb | % | 2.81 | 0.31 | 90.6 |
| Zn | % | 30.6 | 8.06 | 77.4 |
| Mass | g | 20 | 17.19 | |

The residue was now used as a feed for a second stage leach test.

Second Stage Leach

A second stage leach was conducted using the equivalent of 500 kg/t of $H_2SO_4$. The sulfuric acid was reacted with a brine of similar composition to that used in the first stage leach, yielding $CaSO_4.0.5H_2O$ and HCl. The subsequent solution was added to the residue of the first stage leach.

The leach residue from the second stage leach simulation was filtered and washed with water and analysed with the results shown in the table below:

| Metal | Unit | EAF dust feed | Second Stage Leach Residue | Second Stage Leach Extraction |
|---|---|---|---|---|
| Ag | ppm | 45.5 | 9.2 | 88.2 |
| Cu | % | 1.51 | 0.12 | 95.4 |
| Fe | % | 20.55 | 46.4 | −32.3 |
| Pb | % | 2.81 | 0.12 | 97.5 |
| Zn | % | 30.6 | 9.1 | 82.6 |
| Mass | g | 20.0 | 11.7 | |

Other studies of the second stage leach were conducted with brine containing only $CaCl_2$ at 165 g/L. Acidic brine was prepared by the addition of $H_2SO_4$ resulting in the precipitation of $CaSO_4$ and the generation of HCl. Slurries of EAF dust at a density of 100 g/L were prepared, and the equivalents of 200 kg/t and 550 kg/t of $H_2SO_4$ to feed were added to the slurries and reacted for 2 hours. The residues were filtered and washed with water, and analysed with the results shown in the following table:

| Metal | Unit | EAF dust feed | 210 kg/t $H_2SO_4$ Residue | 210 kg/t $H_2SO_4$ Extraction | 550 kg/t $H_2SO_4$ Residue | 550 kg/t $H_2SO_4$ Extraction |
|---|---|---|---|---|---|---|
| Ag | ppm | 45.5 | 65 | 3.3 | 5 | 95.2 |
| Cu | ppm | 15150 | 2080 | 90.7 | 1800 | 94.9 |
| Fe | % | 20.55 | 28 | 7.8 | 46.1 | 2.8 |
| Pb | % | 2.81 | 3.53 | 15.9 | 0.83 | 87.3 |
| Zn | % | 30.6 | 22.9 | 49.3 | 15.6 | 77.9 |
| Mass | g | | 30 | 20.31 | 13 | |

The differences between the metal concentrations in the two residues highlighted the sequential nature of the leach. Copper-bearing phases were leached with a small amount of acid, while silver and lead were associated with the more refractory zinc phases, requiring much more acid for extraction. Greater extraction of the lead and zinc was expected given reaction times longer than 2 hours. Nevertheless, these results demonstrated the viability of using a purely $CaCl_2$ brine in the second stage leach environment.

Example 4

Acid Generation Trials

The second stage leach required the addition of acid in the form of HCl. This was generated by the reaction of $H_2SO_4$ to a $CaCl_2$ rich brine as follows:

$$H_2SO_4 + CaCl_2 \rightarrow 2HCl + CaSO_4 \cdot xH_2O$$

This example outlined the effect of temperature and brine composition on the water content and purity of the precipitate.

Brine Containing Only $CaCl_2$

Solutions containing 165 g/L $CaCl_2$ were heated to 50° C. and 95° C. 10 g of $H_2SO_4$ were added to the solutions and mixed for 1 hour. The residues were filtered and washed with water and ethanol and dried at 50° C. The analyses were compared in the following table with the ideal calcium and sulfur content of the minerals gypsum and bassanite:

| | Ca (%) | S (%) | Mineral |
|---|---|---|---|
| 55° C. | 23.01 | 18.42 | Gypsum |
| 95° C. | 27.48 | 21.98 | Bassanite |
| Gypsum | 23.291 | 18.596 | $CaSO_4 \cdot 2H_2O$ |
| Bassanite | 27.626 | 22.057 | $CaSO_4 \cdot 0.5H_2O$ |

These results clearly demonstrated that the formation temperature controlled the amount of crystalline water present in the precipitate. X-ray diffraction data confirmed the formation of these minerals.

Brine Containing Other Metal Halides Beside $CaCl_2$

The generation of HCl was tested using a brine obtained from the second stage leach of a nickel laterite sample. 1 L of brine was heated to 100° C., 80 g of $H_2SO_4$ was added and the solutions mixed for 1 hour. The samples were filtered and washed with water and ethanol, before drying at 50° C. The chemical composition analysis is shown in the following table along with the initial brine composition:

| | Ca (g/L) | Co (g/L) | Fe (g/L) | Mg (g/L) | Mn (g/L) | Ni (g/L) |
|---|---|---|---|---|---|---|
| Brine | 50 | 2.7 | 35 | 30 | 17 | 14 |

| | Ca (%) | Co (ppm) | Fe (ppm) | Mg (%) | Mn (ppm) | Ni (ppm) | S (%) | Cl (ppm) |
|---|---|---|---|---|---|---|---|---|
| Residue | 27.3 | <0.1 | 0.07 | <0.01 | 20 | 5 | 21.1 | 100 |

Figure 3:
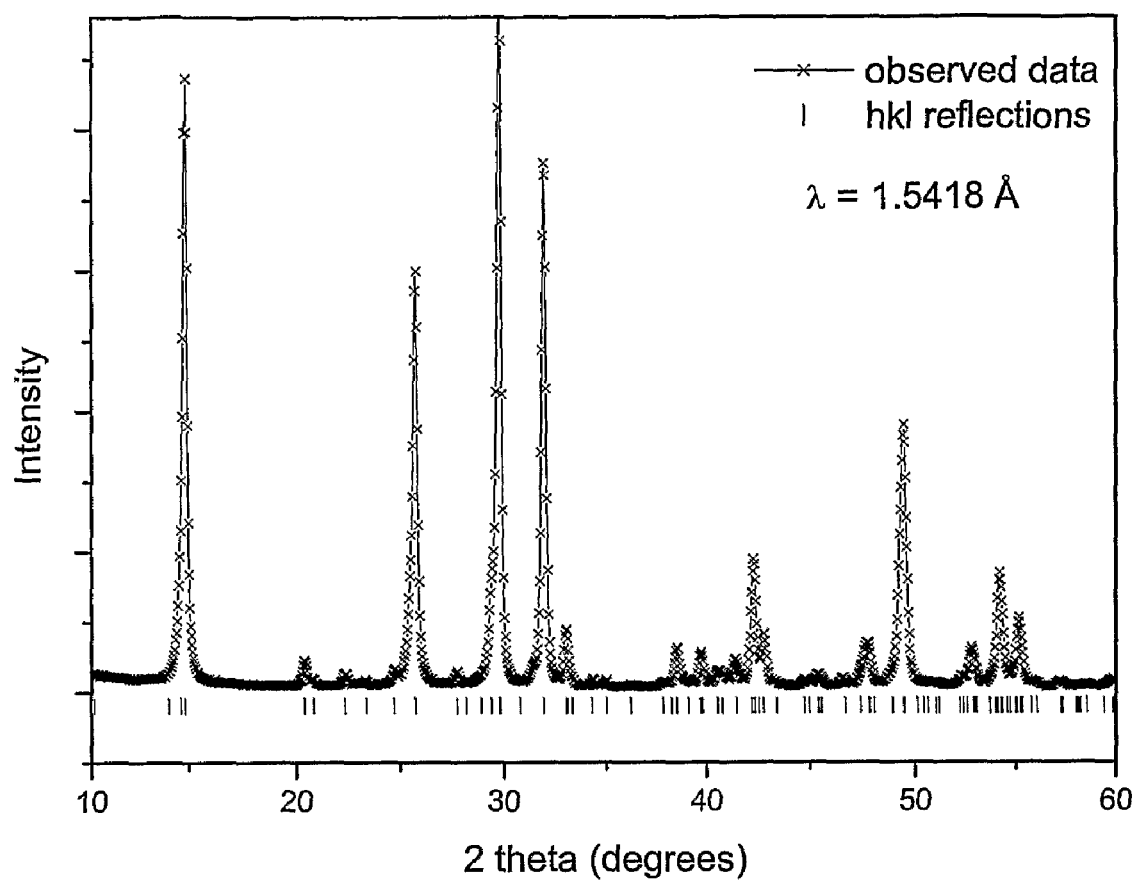
FIG. 3 is an X-ray diffraction plot for a bassanite precipitate.

The high purity of the bassanite precipitate (as confirmed by X-ray diffraction shown in FIG. 3) confirmed that the generation of HCl by the addition of $H_2SO_4$ to a $CaCl_2$ rich solution occurred without loss of metals to the precipitate. This was highly significant, indicating that the precipitate could be sold or sent for disposal without incurring penalties for metal impurities. Furthermore, the water content of the mineral could be controlled by the temperature of the reaction.

Example 5

Arsenic trioxide from smelter and roaster waste stockpiles was converted to a safe-to-dispose of ferric arsenate using a first stage type leach similar to that described in Examples 2 to 4.

A slurry containing the arsenic trioxide was prepared in an acidified (HCl acid prepared as described in Example 4) chloride-based brine comprising dissolved ferrous ions (eg.

from a leachable source of iron, such as a laterite, pyrrhotite etc). The slurry was agitated and sparged with air for two hours at 90-95° C. and a crystalline ferric arsenate precipitate was recovered. The relevant equations were:

$$As_2O_3+6H^+ \rightarrow 2As^{3+}+3H_2O \quad (1)$$

$$2As^{3+}+O_2+6H_2O \rightarrow 2H_3AsO_4 \quad (2)$$

$$2H_3AsO_4+2Fe^{3+} \rightarrow 2FeAsO_4+6H^+ \quad (3)$$

$$2Fe+1.5O_2+6H^+ \sim 2Fe^{3+}+3H_2O \quad (4)$$

$$As_2O_3+2Fe+2.5O_2 \rightarrow 2FeAsO_4 \quad (5)$$

Whilst a number of process embodiments have been described, it will be appreciated that the processes described herein can be embodied in many other forms.

The invention claimed is:

1. A process for recovering a target metal from an oxidised metalliferous material comprising the steps of:
   in an acid generation stage, adding sulfuric acid to a solution comprising a metal halide to generate an acidic aqueous halide solution;
   in a first leaching stage, that is separate to the acid generation stage, leaching the oxidised metalliferous material with the acidic aqueous halide solution to leach the target metal into solution;
   separating the solution from the first leaching stage from first leached solids and passing the solution to a target metal recovery stage in which the target metal is recovered from the solution whilst the metal halide is retained in solution;
   returning the solution with the metal halide therein from the target metal recovery stage to the acid generation stage;
   passing the first leached solids from the first leaching stage to a second leaching stage in which the solids are mixed with the acidic aqueous halide solution; and
   separating the second leached solids from the solution of the second leaching stage, passing a portion of this solution to the first leaching stage and discarding the second leached solids as residue;
   and passing the remaining portion of the solution of the second leaching stage to the acid generation stage whereby, after the sulfuric acid is added to this solution, the acidic aqueous halide solution is then generated for feeding to the second leaching stage.

2. A process as claimed in claim 1 wherein the metal of the metal halide solution is one that forms a precipitate with the sulfate anion of the sulfuric acid such that, with the generation of the acidic aqueous halide solution in the acid generation stage, a hydrohalous acid forms together with a precipitate of the metal sulfate.

3. A process as claimed in claim 2 wherein the metal of the metal halide solution is calcium so that the metal sulfate precipitate is calcium sulfate.

4. A process as claimed in claim 1 wherein, when the oxidised metalliferous material includes precious metal(s), the halide of the metal halide solution comprises chloride and bromide.

5. A process as claimed in claim 1 wherein the acid generation stage is defined by a second leaching stage in which both acid generation, and secondary leaching of the oxidised metalliferous material take place.

6. A process as claimed in claim 5 wherein the sulfuric acid is added directly to the second leaching stage.

7. A process as claimed in claim 6 wherein the metal of the metal halide solution is one that forms a precipitate with the sulfate anion of the sulfuric acid such that the acidic aqueous halide solution generated is hydrohalous acid, with a precipitate of the metal sulfate simultaneously forming and being removed with the second leached solids to be discarded as residue.

8. A process as claimed in claim 1 wherein the target metal recovery stage comprises a precipitation stage in which a precipitate of the target metal is formed by adding a precipitation agent to the solution.

9. A process as claimed in claim 8 wherein the precipitation agent can include a metal that is the metal of the metal halide solution, such that addition of the precipitation agent can maintain a desired concentration of calcium in solution.

10. A process as claimed in claim 9 wherein, when the metal of the metal halide solution forms a precipitate with the sulfate anion and is removed in the acid generation stage, a corresponding amount of that metal is added in the target metal recovery stage to maintain the desired concentration.

11. A process as claimed in claim 8 wherein the oxidised metalliferous material comprises more than one target metal, and a respective precipitation stage is provided for each target metal.

12. A process as claimed in claim 8 wherein the oxidised metalliferous material includes iron, whereby a proportion of that iron is leached into solution in the leaching stage, with at least a proportion of the leached iron then being precipitated in an iron precipitation stage as ferric oxide through the addition of calcium carbonate as the precipitation agent.

13. A process as claimed in claim 12 wherein the oxidised metalliferous material has sufficient residence time in the leaching stage such that leached iron can be oxidised through to haematite.

14. A process as claimed in claim 8 wherein, when the target metal includes copper, the target metal is precipitated in a copper precipitation stage by adding calcium carbonate as the precipitation agent.

15. A process as claimed in claim 8 wherein, when the target metal includes a precious metal, the precious metal is precipitated in a precious metal precipitation stage by adding NaSH as the precipitation agent.

16. A process as claimed in claim 8 wherein, when the target metal includes nickel and/or cobalt, the nickel and/or cobalt is precipitated in a nickel/cobalt precipitation stage by adding calcium hydroxide as the precipitation agent.

17. A process as claimed in claim 16 wherein the calcium hydroxide is slaked lime.

18. A process as claimed in claim 8 wherein, when the target metal includes magnesium, the magnesium is precipitated in a magnesium precipitation stage by adding calcium hydroxide as the precipitation agent.

19. A process as claimed in claim 18 wherein the calcium hydroxide is slaked lime.

20. A process as claimed in claim 1 wherein the target metal recovery stage comprises an electrolytic recovery stage, whereby the solution from the leaching stage is passed to one or more electrolysis cells for metal recovery by electro-deposition.

21. A process as claimed in claim 20 wherein the oxidised metalliferous material comprises more than one target metal, and a respective electrolytic recovery stage is provided for each target metal.

22. A process as claimed in claim 1 wherein the sulfuric acid is added to the acid generation stage to achieve a pH in the range 0 to 1 and a solution Eh of ~600 mV.

23. A process as claimed in claim 1 wherein the temperature of the solution in the leaching stage is in the range 85-95° C.

24. A process for recovering a target metal from an oxidised metalliferous material comprising the steps of:
in an acid generation stage, adding sulfuric acid to a solution comprising a metal halide to generate an acidic aqueous halide solution;
in a leaching stage that is separate to the acid generation stage, leaching the oxidised metalliferous material with the acidic aqueous halide solution to leach the target metal into solution;
passing the solution from the leaching stage to a target metal recovery stage comprising a precipitation stage in which a precipitate of the target metal is formed by adding a precipitation agent to the solution, whereby the precipitation agent can include a metal that is the metal of the metal halide solution, such that addition of the precipitation agent can maintain a desired concentration of that metal in solution, to thereby recover the target metal from the solution whilst the metal halide is retained in solution; and
returning the solution with the metal halide therein from the target metal recovery stage to the acid generation stage,
wherein, when the metal of the metal halide solution forms a precipitate with the sulfate anion and is removed in the acid generation stage, a corresponding amount of that metal is added in the target metal recovery stage to maintain the desired concentration.

25. A process as claimed in claim 24 wherein the leaching stage comprises first and second leaching stages that operate in a counter-current configuration, whereby:
the oxidised metalliferous material is added to the first leaching stage to contact the solution and leach target metal into solution; and
the solution from the first leaching stage is separated from first leached solids and passed to the target metal recovery stage; and
the first leached solids are passed to the second leaching stage to be mixed with the acidic aqueous halide solution generated in the acid generation stage; and
the solution from the second leaching stage is separated from second leached solids and passed to the first leaching stage, and the second leached solids are discarded as residue.

26. A process as claimed in claim 25 wherein a portion of the solution from the second leaching stage is not passed to the first leaching stage but is diverted to the acid generation stage whereby, after the sulfuric acid is added to this solution, the acidic aqueous halide solution is then generated for feeding to the second leaching stage to mix with the first leached solids.

27. A process as claimed in claim 25 wherein the metal of the metal of the metal halide solution is one that forms a precipitate with the sulfate anion of the sulfuric acid such that, the acidic aqueous halide solution generated in the acid generation stage is hydrohalous acid, and such that a precipitate of the metal with sulfate anion forms.

28. A process as claimed in claim 27 wherein, prior to passing the acidic aqueous halide solution to the second leaching stage, any precipitate of the metal formed with the sulfate anion is removed.

29. A process as claimed in claim 1 or 24 wherein, when the halide is chloride, total chloride concentration is in the range of 6 to 8M.

30. A process as claimed in claim 1 or 24 wherein, when the halide is chloride and the solution metal is calcium, at least 30 g/L of $CaCl_2$ is maintained in the process solution.

31. A process as claimed in claim 1 or 24 wherein the halide of the metal halide solution is chloride.

* * * * *